United States Patent [19]

Lefebvre et al.

[11] Patent Number: 5,231,883

[45] Date of Patent: Aug. 3, 1993

[54] TRANSIENT FLOWMETER CALIBRATION FACILITY

[75] Inventors: Paul J. Lefebvre, Tiverton, R.I.; William W. Durgin, Holden, Mass.

[73] Assignee: The United States of America as represented by the Secretary of the Navy, Washington, D.C.

[21] Appl. No.: 632,707

[22] Filed: Dec. 24, 1990

[51] Int. Cl.⁵ .............................................. G01F 1/00
[52] U.S. Cl. ........................................ 73/861; 73/273
[58] Field of Search .................. 73/3, 861, 223, 293, 73/215, 273 R

[56] References Cited

U.S. PATENT DOCUMENTS

| | | | |
|---|---|---|---|
| 2,079,699 | 5/1992 | Thomas | 73/293 |
| 3,177,699 | 4/1965 | Linquist et al. | 73/3 |
| 4,373,815 | 2/1983 | Bruce | 73/293 X |
| 4,729,236 | 3/1988 | Samborsky | 73/3 |

*Primary Examiner*—Herbert Goldstein
*Attorney, Agent, or Firm*—Michael J. McGowan; Prithyi C. Lall; Michael F. Oglo

[57] ABSTRACT

An apparatus for defining the free surface of a moving column of a fluid in a vertical pipe to enhance the accuracy of measurements of transient rate of flow of the fluid using electromagnetic flowmeter is described. It provides a neutrally buoyant plug which stays in contact with the free surface of the column of the fluid at all times and thus defines the free surface of the fluid moving in the vertical pipe accurately and reduces the oscillations of the free surface of the fluid.

2 Claims, 1 Drawing Sheet

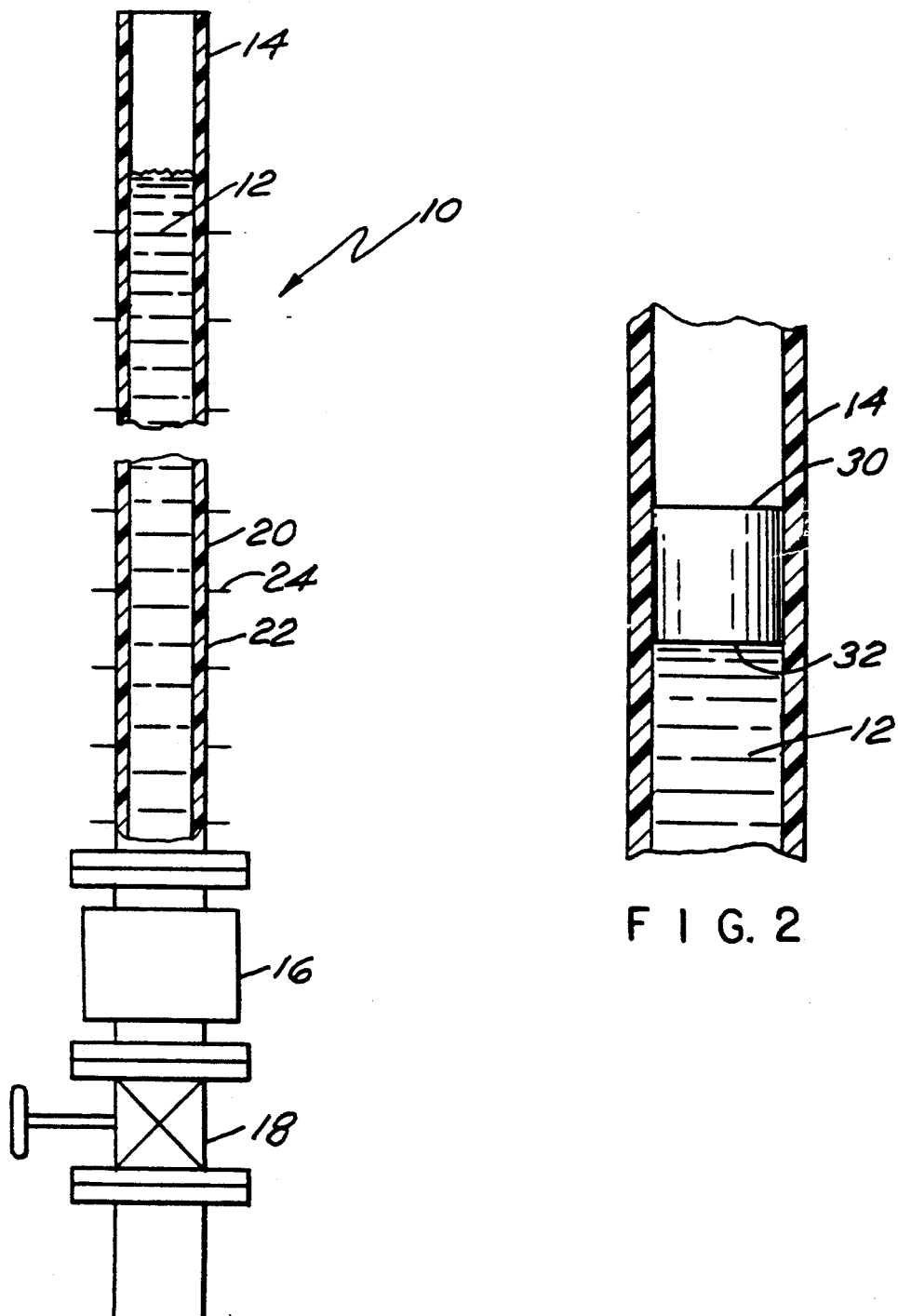

TRANSIENT FLOWMETER CALIBRATION FACILITY

STATEMENT OF GOVERNMENT INTEREST

The invention described herein may be manufactured and used by or for the Government of the United States of America for governmental purposes without the payment of any royalties thereon or therefor.

Subject patent application is related to other three copending patent applications by Paul J. Lefebvre: Ser. Nos. 07/632,709; 07/632,872; 07/632,708; and of even filing dates and which are also directed to various aspects of measurements of flow of fluids such as water.

BACKGROUND OF THE INVENTION (1) Field of the Invention

This invention generally relates to fluid flow measurements and more specifically to an apparatus and method for improving the accuracy of transient fluid flow measurements by defining the free surface of the fluid.

(2) Statement of Prior Art

Flowmeters which are capable of measuring transient flows, i.e., changing flow velocity, have became available only recently. As a consequence, the need to accurately calibrate these flowmeters under a transient flow conditions became evident. One such system or facility has been described and claimed by Paul J. Lefebvre in the above-identified patent applications of even filing date.

The general concept of that facility was to accurately measure the transient velocity of a free-falling vertical column of a fluid such as water to which the output from the transient flowmeter under test could be compared. The velocity of the water column, i.e., calibration velocity, was measured by monitoring the rate of change in elevation of the free surface of the column.

The water column was contained within a clear acrylic pipe. The transient flowmeter was installed at the lower end of this pipe. Each test was initiated by opening a ball valve which was placed below the flowmeter so as not to disturb the flow at the flowmeter. To measure the free surface velocity, a large number of photo emitter/photo diode optical sensor pairs were distributed every 5 cm along the pipe. As the water surface passed a sensor station, a change in the intensity of light transmitted from the photo emitter to the photo diode occurred. This resulted in a sharp jump in the voltage generated at the photo diode. The time of each voltage level change was monitored electronically and subsequently used to calculate the velocity of the water column, i.e. velocity is equal to the distance between sensor pairs divided by the time between consecutive triggering of the sensor pairs. However, the system was accurate only at low flow velocity range, but inaccurate at high flow velocity range. One possible explanation has been considered due to oscillations in free surface of water giving rise to indefiniteness in the position of the free surface of the water column. It is thus desirable to improve the measurements at the high velocity range by accurately defining the position of the free surface.

SUMMARY OF THE INVENTION

The objects and advantages of the present invention are accomplished by using a neutrally buoyant opaque water surface stabilizing plug according to the teachings of subject invention. The plug eliminates the fluctuations or oscillations at the water surface occurring at high flow velocity range.

An object of subject invention to improve upon the accuracy of fluid flow measurements of a fluid at the high flow velocity range.

Another object of subject invention is to provide means for reducing oscillations or fluctuations of the free surface of the fluid at its high flow velocity range.

Still another object invention is to measure the position of the free surface of the fluid accurately.

Other objects, advantages and novel features of the invention will become apparent from the following detailed description thereof when considered in conjunction with the accompanying drawings wherein:

BRIEF DESCRIPTION OF THE DRAWINGS

FIG. 1 is a schematic representation of a column of fluid under test; and

FIG. 2 is a diagrammatic representation of the neutrally buoyant opaque water surface stabilizing plug according to subject invention.

DESCRIPTION OF THE PREFERRED EMBODIMENT

Referring now to FIG. 1, there is shown an apparatus 10 which was described in our article: A Transient Electromagnetic Flowmeter and Calibration Facility, Journal of Fluids Engineering, pp 12–15 b 52323128.001 (March 1990). A vertical column 12 of a fluid such as water is contained in a clear acrylic tube or pipe 14. A transient flowmeter 16; which is described in detail and claimed in a patent application Ser. No. 07/632,872, and of even filing date and entitled FLOWMETER FOR UNSTEADY FLUID FLOW by Paul J. Lefebvre; is installed at the lower end of pipe 14. A commercially available ball valve 18 is placed below flowmeter 16 so as not to disturb the flow at the flowmeter. To measure the free surface velocity of the fluid, a large number of photo emitter/photo diode optical sensor pairs are installed at regular distance intervals, preferably 5 cms apart, such as 20 and 22 of the acrylic pipe 14. As the free surface of water passes a sensor station such as 24, a change in the intensity of light transmitted from the photo emitter to the photo diode occurs resulting in a sharp jump in the voltage generated at the photo diode. The time for each voltage level change is monitored electronically and subsequently used to calculate the velocity of the water. This worked quite well at low fluid velocity range, but introduced inaccuracies at the high fluid velocity range due to oscillations in the free surface of the fluid (water) column. The teaching of subject invention to overcome this problem is shown in FIG. 2 wherein a neutrally buoyant opaque plug 30 is provided to reduce the oscillations or fluctuations of the free surface of the water column 12. The term "neutrally buoyant" in a medium is commonly understood to be something which is neither negatively buoyant (i.e., such a body will sink when placed in the medium) nor positively buoyant i.e., such a body will always float when placed in the medium) and it will maintain its position at which it is launched in the medium. The thickness of the plug 30 and the diametral clearance between the plug and the acrylic tube or pipe 14 are chosen so that the bottom surface 32 of plug 30 remains essentially perpendicular to the longitudinal axis of pipe 14 throughout the transient flow. The actual dimensions of the plug are based on the overall accuracy required and resulting allowable departure from the perpendicular direction to the longitudinal axis of pipe 14 can be accommodated. It is to be noted that, the diametral clearance around the plug is large enough so that the plug is free to fall and does not ride along the walls of pipe 14 creating friction which may subsequently result in separation between plug 30 and the free surface of water.

Briefly stated, in order to reduce inaccuracies of high velocity range water flow measurements due to oscillations or fluctuations of the free surface of water, a neutrally buoyant opaque plug is provided according to the teachings of subject invention. The dimensions of the plug are optimized to obtain the desired accuracy in the measurements by reducing the effect of fluctuation of the free surface of the water column at the high velocity range.

From the foregoing description, one skilled in the art can easily ascertain the essential characteristics of this invention and without departing from the spirit and scope thereof, can make various changes and modifications of the invention to adapt it to various usages and conditions. It is therefore understood that within the scope of the appended claims the invention may be practiced otherwise than as specifically described.

What is claimed is:

1. An apparatus for accurately defining free surface of a column of a moving fluid under test in a fluid pipe for accurate fluid flow measurements which includes:

means for measuring positions at a plurality of stations of the free surface of said moving fluid for fluid flow measurements including a photo emitter-photo diode pair at each of said plurality of stations to sense a change in light intensity due to passing of the free surface of the column of said moving fluid; and means for reducing oscillations of the free surface caused by flow rate transients of said moving fluid under test, said means including neutrally buoyant plug means which stays in contact with the free surface of the column of said moving fluid.

2. The apparatus of claim 1 wherein said moving fluid is water.

* * * * *